Nov. 20, 1956  K. ILLGNER  2,770,909
FISHERMAN'S ANTI-FOULING SINKER
Filed Jan. 3, 1956
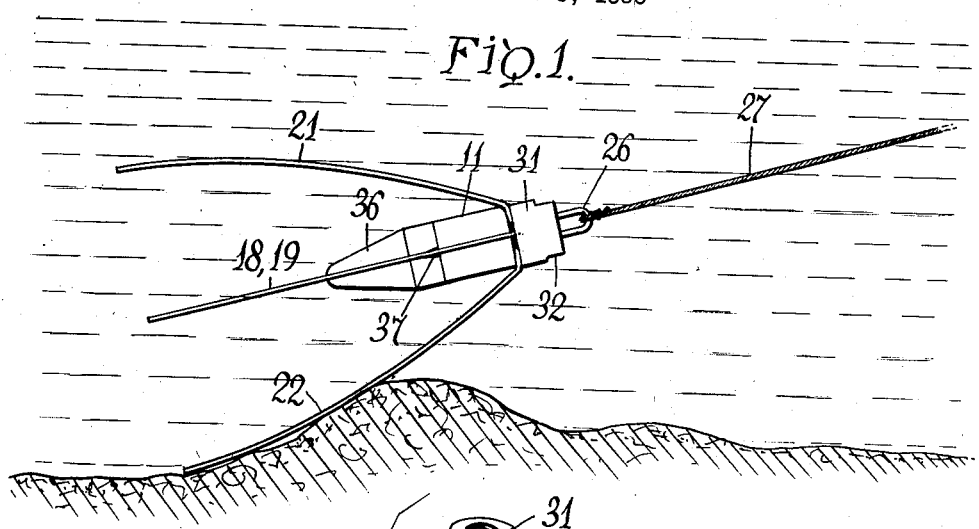
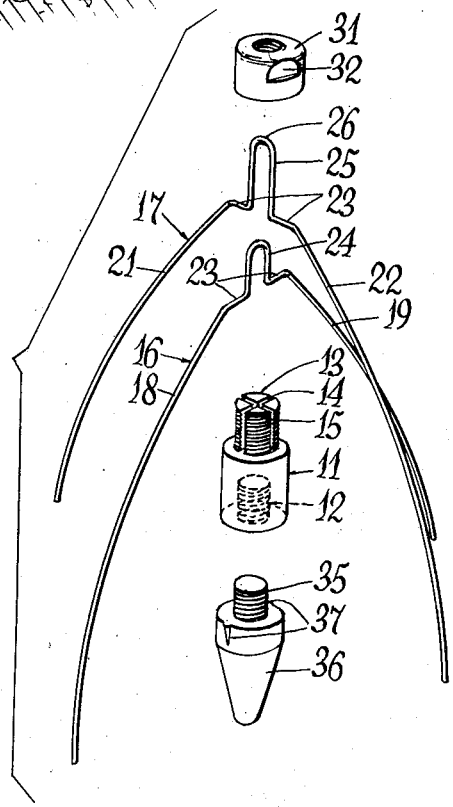
INVENTOR.
Karl Illgner,
BY
ATTORNEY.

United States Patent Office 2,770,909
Patented Nov. 20, 1956

2,770,909
FISHERMAN'S ANTI-FOULING SINKER
Karl Illgner, Tonawanda, N. Y.

Application January 3, 1956, Serial No. 556,888

3 Claims. (Cl. 43—43.14)

This invention relates to a sinker adapted to be attached to a fishing line to maintain the end of the line submerged, and it has particular reference to a sinker provided with means to prevent the sinker from becoming fouled by, or entangled with objects or irregularities on the bottom of a body of water.

The invention will be readily understood from the following description of a preferred embodiment, illustrated in the accompanying drawing, wherein:

Fig. 1 is an elevation of the sinker attached to a fishing line and disposed on the bottom of an irregular water bed; and Fig. 2 is an exploded perspective of the sinker.

The sinker comprises a body 11 which may be of generally cylindrical form, and which is provided on its lower end with a threaded opening 12, and on its upper end with a reduced and threaded screw stud 13. The stud 13 is axially formed with slots 14 and 15, disposed along diameters, and preferably at right angles to each other. Only two slots are shown, and they have been found sufficient, but one or more additional slots could be provided if desired. These slots receive resilient metal wires 16 and 17, each of which is bent into what might be termed a wishbone shape, to provide oppositely disposed feelers or antennae 18, 19, and 21, 22, which diverge outwardly from their upper ends. These pairs of feelers are spaced at their upper ends a distance equal to or slightly greater than the diameter of the body 11, and they are there bent with aligned straight sections 23 which, in assembly, lie on the end surface of the body 11 and in the slots 14 and 15. These straight sections merge into upwardly extending bails 24, 25, respectively, one of which is no higher than the length of the stud 13, while the other extends beyond the stud to provide an exposed eye 26 to which a leader 27 may be connected.

The width between the legs of the bails 24 and 25 is no greater than the diameter of the stud 13, so that, after the wires are inserted in their slots, they may be retained by a nut 31, which is placed over the projecting eye 26 and screwed on the stud 13. The nut may be formed with flat spots 32 to tighten it with a pair of pliers or by the grip of the fingers. In this connection, it should be noted that the bails 24 and 25, which fit snugly in the slots 14 and 15, offset any tendency of the nut 31 to compress the sectors of the stud inwardly, and the resilience of the wires provides in effect a lock washer action against the nut 31, precluding its accidental loosening and disengagement when the sinker is pulled over a rough surface.

The threaded opening 12 in the bottom of the body 11 receives a screw 35 projecting from and embedded in a weight or plummet 36, of suitable material such as lead, and which, as herein shown, is substantially conical in form, having a base of the same diameter as the body 11. Diametrically disposed projections 37 may be provided to facilitate attachment or removal of the plummet. It may be noted, as fishermen will readily understand, that there are regions where trolling is a favorite sport, and yet where the intensity of the current may vary greatly within a short distance. For example, the waters of the lower end of Lake Erie do not exhibit a strong current, but from the mouth of its outlet, in the Niagara River, to and beyond Niagara Falls, a very strong current exists. When a fisherman in such a region wishes to troll in both areas, he need only interchange the plummet 36 to one of greater or less weight, without the labor of rigging the entire tackle anew.

It will be understood that in use the several antennae radiating around and outwardly from the body of the sinker and its plummet will protect the same from becoming snagged on a subsurface obstruction. Thus, in Fig. 1, there is shown an irregularity on the bottom of the body of water, and as the fisherman pulls his line over it, the resilient wires form cams and a protective enclosure, to preclude the sinker from snagging. In the water bodies previously referred to as an example, the bottoms include outcroppings of creviced rock, as well as submerged stumps and other forms of obstruction. No lost lines or tackle have been reported when the present sinker has been used.

Many fishermen take their tackle apart for storage in a suitable container after completing their activity. The relatively wide spacing of the terminals of the antennae would require allotment of considerable space if the wires were fixed in place. It will be readily apparent that by removing the nut 31, the wires can be withdrawn and laid flat, and hence no excess storage space is required.

While the invention has been described with respect to a practical single embodiment thereof, it should be understood that it is desired to accord it a scope embracing all variations which are encompassed by the following claims.

I claim:

1. A fisherman's sinker comprising a weighted body, a threaded stud projecting from the body, said stud being formed with axial slots, resilient wires disposed in the slots and diverging outwardly from and around the body, at least one of said wires being formed with a bail extending beyond the end of the stud, and a nut threaded on the stud and around said bail to retain the wires in position, the end of the bail thereby providing an accessible eye for the attachment of a fishing line.

2. A fisherman's sinker comprising a generally cylindrical body, a threaded stud projecting from one end of the body, said stud being formed with diametrically disposed axial slots, resilient wires disposed in said slots and against the end of the body, said wires being bent to diverge outwardly from and around the body, at least one of said wires being formed with a bail extending axially of the stud, said bail having a width substantially no greater than the diameter of the stud, a nut threaded onto the stud and against those portions of the wires adjacent the stud end of the body, said bail being of sufficient length to project beyond the nut and stud, thereby to provide an eye for attachment to a fishing line, and a weight detachably connected to the end of the body opposite the stud.

3. A fisherman's sinker comprising a cylindrical body having ends, a weight detachably connected to the body at one end, a stud of less diameter than the body extending from the other end of the body, said stud being formed with diametrically disposed and axially extending slots from the end of the stud to the body, wires disposed in the slots, said wires having straight sections abutting the body and outwardly diverging portions from the straight sections around the body and weight, and a nut removably threaded on the stud to retain the wires in position, said nut jamming the straight sections against the end of the body, at least one of said wires being formed with a bail extending axially of the stud, and said bail forming an eye to receive a fishing line.

References Cited in the file of this patent

UNITED STATES PATENTS

| | | |
|---|---|---|
| 402,231 | Coles | Apr. 30, 1889 |
| 1,502,417 | Arnstein | July 22, 1924 |
| 2,037,232 | Hendricks | Apr. 14, 1936 |
| 2,258,080 | Thomas | Oct. 7, 1941 |

FOREIGN PATENTS

| | | |
|---|---|---|
| 260,598 | Italy | Oct. 2, 1928 |